(12) United States Patent
Steve

(10) Patent No.: US 7,488,116 B2
(45) Date of Patent: Feb. 10, 2009

(54) UNIVERSAL COUPLING OF SMALL CORE OPTICAL FIBER TO LARGE LASER FOCI

(75) Inventor: Griffin Steve, Phoenix, AZ (US)

(73) Assignee: Innova Quartz Incorporated

( * ) Notice: Subject to any disclaimer, the term of this patent is extended or adjusted under 35 U.S.C. 154(b) by 0 days.

(21) Appl. No.: 11/290,376

(22) Filed: Nov. 30, 2005

(65) Prior Publication Data

US 2007/0122084 A1    May 31, 2007

(51) Int. Cl.
G02B 6/36 (2006.01)
A61B 5/00 (2006.01)

(52) U.S. Cl. ............... 385/79; 385/31; 385/33; 385/61; 385/76; 385/77; 385/78; 385/92; 385/94; 600/342

(58) Field of Classification Search ........... 385/61, 385/76–79, 94, 92, 33, 31; 600/142
See application file for complete search history.

(56) References Cited

U.S. PATENT DOCUMENTS

| | | | |
|---|---|---|---|
| 4,185,883 A | | 1/1980 | Chown et al. |
| 4,191,447 A | * | 3/1980 | Borsuk ............... 385/78 |
| 5,039,193 A | * | 8/1991 | Snow et al. ............ 385/25 |
| 5,231,684 A | * | 7/1993 | Narciso et al. ......... 385/80 |
| 5,291,570 A | * | 3/1994 | Filgas et al. .......... 385/78 |
| 5,526,455 A | * | 6/1996 | Akita et al. ........... 385/93 |
| 5,745,626 A | * | 4/1998 | Duck et al. ........... 385/96 |
| 6,282,349 B1 | * | 8/2001 | Griffin ................ 385/81 |
| 6,520,689 B2 | * | 2/2003 | DeMartino et al. ...... 385/98 |
| 6,671,432 B2 | * | 12/2003 | Imada et al. .......... 385/33 |
| 6,883,975 B2 | | 4/2005 | Clarkin et al. |
| 6,902,327 B1 | * | 6/2005 | Johnson .............. 385/60 |
| 7,090,411 B2 | * | 8/2006 | Brown ................ 385/92 |
| 2003/0016922 A1 | * | 1/2003 | DeMartino et al. ...... 385/98 |
| 2003/0081896 A1 | * | 5/2003 | Kroupenkine .......... 385/33 |
| 2005/0196108 A1 | * | 9/2005 | Brown ................ 385/88 |
| 2006/0018609 A1 | * | 1/2006 | Sonoda et al. ......... 385/93 |
| 2006/0024001 A1 | * | 2/2006 | Kobayashi ............ 385/50 |

* cited by examiner

*Primary Examiner*—Brian Healy
*Assistant Examiner*—Guy G Anderson
(74) *Attorney, Agent, or Firm*—The Halvorson Law Firm

(57) ABSTRACT

It is often desirable to efficiently couple laser foci that are dimensionally large to dimensionally small optical fibers. A fiber fused in a lower refractive index fiber is disclosed. The fiber/ferrule construct is characterized by having no taper of the fiber in the ferrule and a negative lens shape at a fiber/ferrule face. This construct enable the coupling of imparting rays that fall outside of the fiber core into the transmission path of the fiber. Where the laser systems are integrated in a manner that precludes altering the focusing optic, such as in surgical laser systems, or where the laser's beam focal properties are such that reducing the focal spot diameter is impractical for fiber coupling, modification of the optical fiber input geometry offers a means of customizing the laser-to-fiber interface for applications involving different fiber diameters.

2 Claims, 3 Drawing Sheets

UNIVERSAL COUPLING OF SMALL CORE OPTICAL FIBER TO LARGE LASER FOCI

FIELD OF THE INVENTION

This invention relates generally to applications of silica core optical fiber in delivery of energy pulses or sustained power in surgery, welding and ordinance ignition as well as hermetic ferrule terminations of doped core fiber such as that used in telecommunications. The principles outlined herein may also apply to other non-surgical applications, particularly where hermetic seals are desired in telecommunications or sensing applications of optical fiber for compliance with Telcordia standards, Military Specifications or other standards or in environments where hermetic seals are beneficial, e.g. "down hole" sensors for the oil industry. Applications other than laser focus to fiber coupling may be envisioned, such as improved light gathering efficiency in spectroscopy and astronomy or anywhere that tapered fiber optics are currently used.

BACKGROUND OF THE INVENTION

U.S. Pat. No. 4,185,883 (Chown et al.) discloses an optical fiber coupling element that includes a glass sleeve secured to a length of optical fiber. The optical fiber is placed in the glass sleeve, and the sleeve is heated so that it collapses around the fiber to hold the fiber in place.

U.S. Pat. No. 6,883,975 (Clarkin et al.) discloses a ferrule presenting a preferentially "softenable" substance within the bore for reducing fusion temperatures and thus reducing distortion of the ferrule and element fused within.

U.S. Pat. No. 6,282,349 (Griffin) discloses a fiber fused in a ferrule that is the definition of prior art disclosed herein which is an evolutionary step in this product development, albeit the current art contains branching embodiments and applications beyond those anticipated in the prior art. Griffin also discloses the use of a tapered fiber for coupling to laser foci larger than the base fiber core. Tapered fibers are focus parameter dependent, i.e. the taper ratio and angle are only optimum for foci of given diameter and numerical aperture (NA).

Much prior are also exists for lenses formed directly on fibers, primarily for improving coupling in telecommunications applications, but also for beam shaping fiber output. The art disclosed herein can also be viewed.

It is often desirable to employ a ferrule in joining optical components together or when incorporating optical components into other devices. A ferrule is a piece of material (glass, ceramic, polymer, metal or composite) having one or more holes into which components such as optical fibers or capillaries may be inserted, offering added support to the fiber/capillary as well as increased structural strength and facilitate alignment of the fiber/capillary with another, similarly terminated component.

In most cases, adhesives secure components carried within ferrules but adhesives can be problematic due to the difference in chemical and physical properties of the adhesives with respect to the fiber and ferrule and inherent liability of organic compounds to oxidation under relatively minor laser illumination. Adhesive terminated fibers in ferrules also are not truly hermetic and are labile to elevated temperatures and certain chemicals. In some applications, it is desirable to provide a fiber-in-ferrule (or capillary-in-ferrule) that may be immersed within solutions of extreme pH, solvents that degrade adhesives, vacuum or elevated pressure and temperature environs. In many, more routine applications it is desirable to provide a seal to prevent migration of gasses or other contamination from the environment into a package intended to isolate an active device, e.g., a semiconductor laser. Where a fiber must pass through a bulkhead, e.g., from a monitor to within a chemical reaction or process stream, chemical and thermal resistance may be critical in maintaining the system seal.

More germane to the art disclosed herein, a ferrule may also act to redirect overfill energy in fibers used in a high power coupling application such as a industrial welding and medical laser delivery systems as in U.S. Pat. No. 6,282,349 (Griffin).

SUMMARY OF THE INVENTION

The invention claimed and described herein comprises a strategy for fusions of protective ferrules about silica optical fiber for reinforcement, hermeticity, capture and redirection of overfill energy and other applications. The primary advantages of the invention over prior art lie in simplicity, which manifests as superior reproducibility in coupling conditions, and in universality. The preferred embodiment is intended to provide improved efficiency in coupling and fiber-to-laser focus alignment for silica core fiber optics where the core is smaller than the laser focal spot, independent of the focal spot size and NA, but it is envisioned that additional applications will benefit from the method of executing the preferred embodiment, with or without some modification of approach, as required.

In the preferred embodiment, a ferrule with a constant diameter, axial bore is fused over a fiber of constant diameter, substantially along the entire length of the ferrule. Alternatively, the constant diameter bore ferrule is flared to a larger diameter at one end such that, upon fusing the fiber within the ferrule along the entire length of constant diameter a reflective cone is produced about the fiber at one terminus of the ferrule.

In contrast to prior art, the invention disclosed herein functions equally well when coupled to a wide range of laser focal spot diameters and convergence angles. The tapered fiber strategy used in prior art is optimized for but a single focal spot diameter and focal convergence angle maximum, necessitating acceptance of some variability in performance even where coupling to a single make or model of laser system and necessitating multiple design variations to accommodate all laser makes and models. For example, in holmium laser lithotripsy, the DEKA laser (El. En. SPA, Italy) produces a focal spot of some 550 μm diameter with a numerical aperture of approximately 0.10, requiring a 200 μm core fiber to be increased 2.75-fold in diameter to spatially match the focus where a New Star Lasers holmium (USA) produces a focal spot of 320 μm at a numerical aperture of approximately 0.18, necessitating a much lower taper ratio of optimum performance.

Among the objects of the present invention are the following:

To provide a new and useful fused ferrule termination of optical fiber for improved coupling efficiency between relatively large diameter laser foci and relatively small diameter fibers;

To provide a new and useful method of producing fused ferrule termination of optical fiber for improved coupling efficiency between relatively large diameter laser foci and relatively small diameter fibers;

To provide a new and useful fused ferrule termination of optical fiber for improved axial alignment between relatively large diameter laser foci and relatively small diameter fibers;

To provide a new and useful method of producing fused ferrule termination of optical fiber for improved axial alignment between relatively large diameter laser foci and relatively small diameter fibers;

To provide a new and useful ferrule geometry for enabling highly efficient, hermetic ferrule, high energy terminations on doped silica clad, silica core fiber;

To provide a new and useful ferrule geometry for enabling highly efficient, hermetic ferrule, high energy terminations on silica clad, doped silica core fiber;

To provide a new and useful ferrule geometry for enabling highly efficient, hermetic ferrule, high energy terminations on polymer clad silica fiber;

To provide a generalized strategy and methodology for producing fused ferrule terminations of optical fiber for improved axial alignment and coupling efficiency between relatively large diameter laser foci and relatively small diameter fibers.

The novel features that are considered characteristic of the invention are set forth with particularity in the appended claims. The invention itself, however, both as to its structure and its operation together with the additional objects and advantages thereof will best be understood from the following description of the preferred embodiment of the present invention. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments of the invention is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF THE PREFERRED EMBODIMENT

Figure 1:
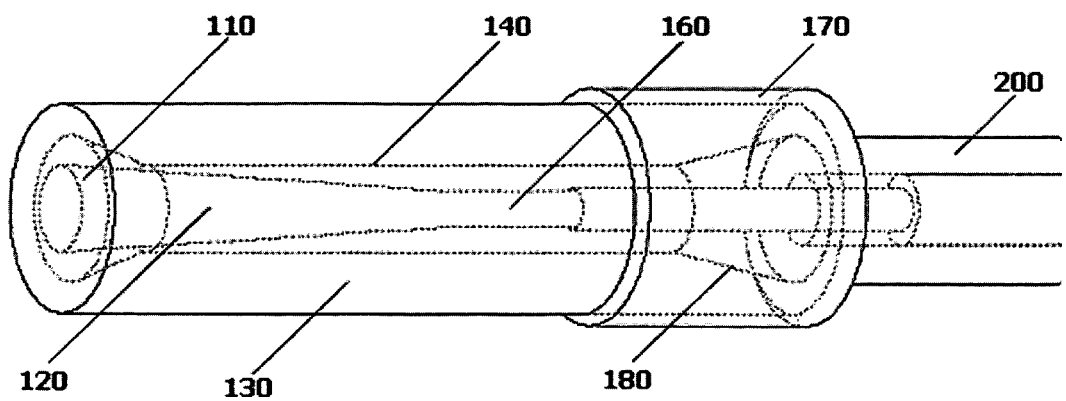
FIG. 1 is a perspective diagram of the fiber-in-ferrule for the prior art.

FIG. 1 comprises a view in section of the prior art ferrule 130, equipped with a standard insertion cone 180 to aid entry of delicate, bare fiber, which may or may not employ a preferentially softenable material within bore 140. The fiber 160 is tapered 120 to a larger diameter at the fused fiber face 110 in order to accommodate laser foci that are larger then the base fiber. The fiber 160 is maintained in alignment with the laser beam axis at the fusion face 110 and at crimp 200. Overfill energy (angular or spatial) is captured in the surrounding glass ferrule 130 and is conducted to the insertion cone 180 where it is redirected to a crimp/beam absorber portion 170 of the crimp 200.

Figure 2:
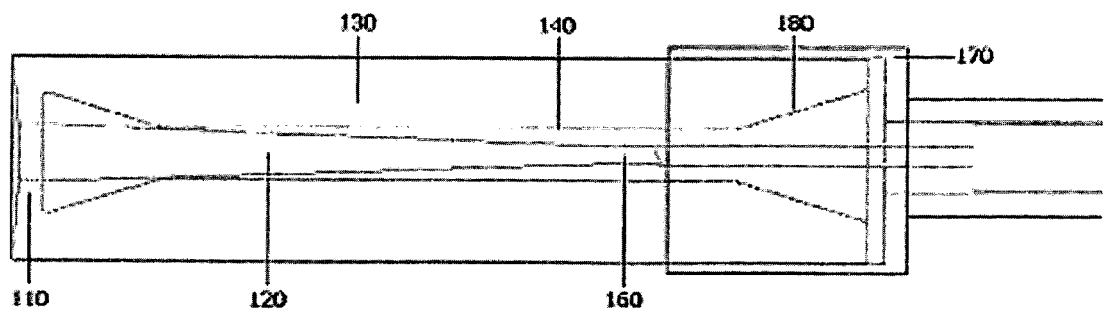
FIG. 2 is a side view in section taken generally along the centerline of FIG. 1.

FIG. 2 is a view in partial section of the fiber depicted in FIG. 1, better illustrating the tapered fiber fused-in-ferrule designs. Again, the strategy of coupling laser foci that are larger than the base fiber 160 depends upon tapering the fiber 120 to a larger diameter at the input face 110. The dimensions of the taper 120 are optimum for only one launch condition (laser focus property set including focal diameter and convergence angle).

Figure 3:
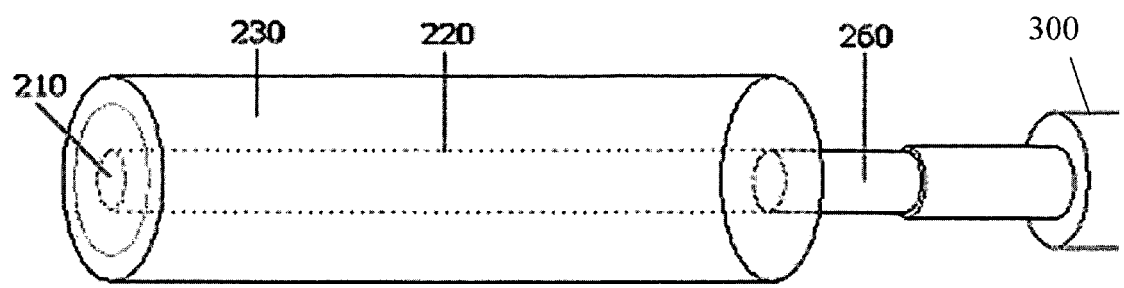
FIG. 3 is a perspective diagram of a terminated fiber element within the ferrule illustrating the preferred embodiment for doped silica clad, silica core optical fiber.

FIG. 3 is a view in perspective view of the simplest embodiment of the present invention disclosed herein. An unaltered bare fiber 260 (is not tapered) is fused within a ferrule 230 having a lower refractive index than the base fiber 260 over a considerable length 220. As in FIG. 1, a crimp/beam absorbing accessory may be added over the fiber buffer 300 to provide strain relief to the delicate bare fiber core 260 and absorb energy not captured in the fiber core 260. A negative lens is formed on the fiber/ferrule input face at 210 to couple energy through the fiber wall in the ferrule/fiber fused interface when the energy imparts the input face 210 outside the zone of the fiber core 220. While most of the laser radiation couples normally, through the core face, the overfill is caused to couple through the cylindrical wall of the fiber 260.

Figure 4:
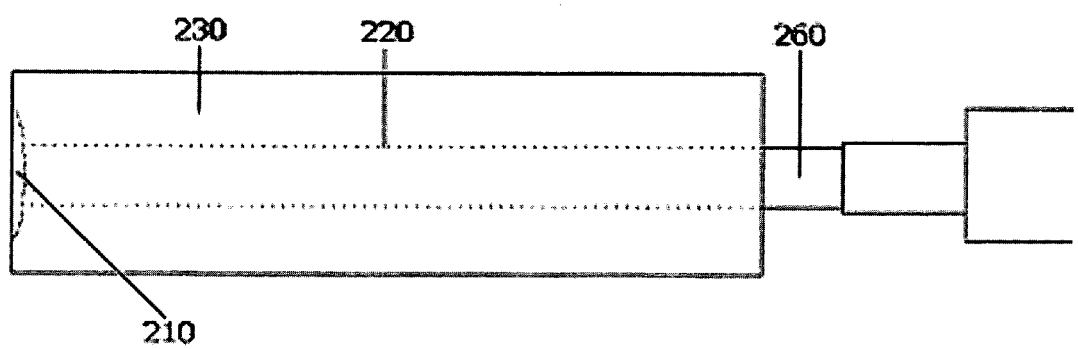
FIG. 4 is a side view in partial taken generally along the centerline of FIG. 3

FIG. 4 is a view in partial section of FIG. 3, better illustrating the negative lens element on the input face 210 that is critical to function. It can be seen from FIG. 4 that the negative lens element has a diameter that is greater than that of the fiber core 260. This puts the outer ring section of the negative lens element on the face of the ferrule, thereby allowing overfill radiation to be coupled back into the fiber core 260.

In an alternate embodiment of the present invention, the fiber 260 may include a layer of optical cladding, thus the ferrule 230 may be fused to the optical cladding, which, in turn, is fused to the fiber 260.

Figure 5:
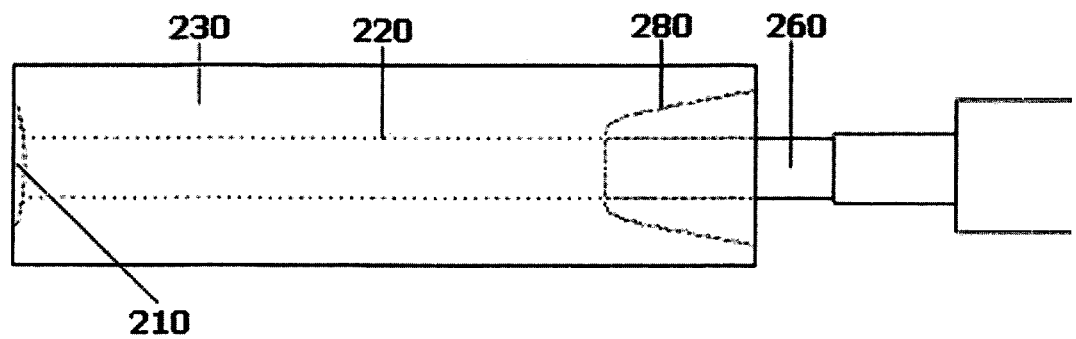
FIG. 5 is a side view in partial section of an alternative configuration of the preferred embodiment.

FIG. 5 illustrates the addition of an insertion cone 280 to the instant ferrule and its appearance post-fusion of the fiber 260 to the ferrule 230 bore at 220. With the addition of the crimp ferrule/beam absorber as depicted in the prior art figures, the cone 280 would function to redirect energy as in prior art.

Figure 6:
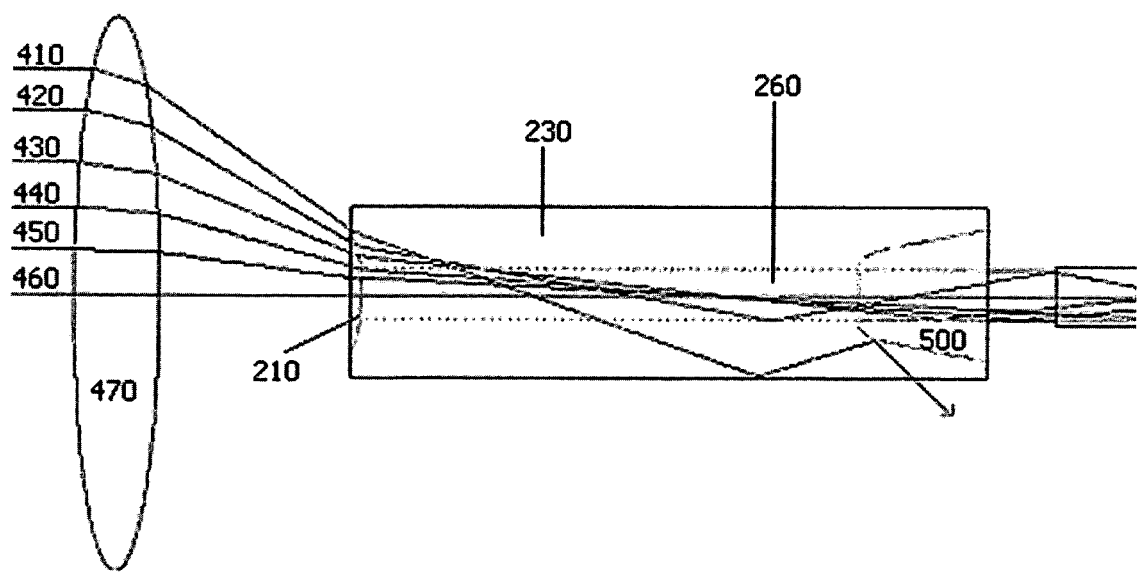
FIG. 6 is a side view in partial section depicting broader fiber coupling capacity enabled by the present invention.

FIG. 6 depicts the function of the preferred embodiment in coupling laser energy 410, 420, 430, 440, 450, 460 focused by a lens 470 onto the fiber-in-ferrule construct. Rays 440, 430, and 420 that impart the device outside of the fiber core within the fused input face, but within the curvature of the negative lens 210, are coupled into the fiber core 260 through the sides of the fiber. Rays, 450 and 460 that fall within the fiber core in the fused face 210 are coupled normally. Rays 410 that fall outside the negative lens curvature fail to couple to the fiber core and are dispensed with as in prior art.

The optical components of the present invention, the core, the cladding and the ferrule, are preferably silica or doped silica or all of the various combinations of doped and undoped silica. The doping agent may be fluorine, germanium, boron and other like elements and the dopants may vary in concentration across the radius of the ferrules (graded index). Further, optical polymers may also be used as any of the optical components.

Where desired, the insertion cone is also easily produced by $CO_2$ laser machining. Fusion of the ferrule to the fiber is accomplished after removing a section of protective polymer from the fiber end and insertion of the fiber into the doped ferrule. The energy of fusion may be provided (preferably) by laser or by micro furnace, flame or other means. Formation of the negative lens element upon the fiber-in-ferrule face is preferably accomplished with a CO2 laser, but may also be accomplished by micro scale physical grinding and polish or chemical etch and polish.

The preferred embodiment of the invention is described above in the Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

The invention claimed is:

1. An optical fiber termination comprising an optical fiber core fused within a transparent optical ferrule where the ferrule comprises the same material as that of the optical fiber core and there is no intermediate cladding layer and a negative lens shape formed on a terminal end, where the negative lens shape is a concave cavity having a diameter that is greater than or equal that of the fiber core putting the outer ring section of the negative lens element on the terminal end of the ferrule, thereby allowing overfill radiation to be coupled back into the fiber core.

2. The fiber termination according to claim 1 where the fiber core is silica and the ferrule is silica.

* * * * *